United States Patent [19]

Kusakabe

[11] Patent Number: 4,566,895
[45] Date of Patent: Jan. 28, 1986

[54] MOLDS USED FOR BLOWING GLASS ARTICLES

[75] Inventor: Masayoshi Kusakabe, Shiga, Japan

[73] Assignee: Nippon Electric Glass Company, Limited, Otsu, Japan

[21] Appl. No.: 745,381

[22] Filed: Jun. 17, 1985

Related U.S. Application Data

[63] Continuation of Ser. No. 605,786, May 1, 1984, abandoned.

[30] Foreign Application Priority Data

May 4, 1983 [JP] Japan ................................. 58-77547

[51] Int. Cl.$^4$ ............................................. C03B 9/347
[52] U.S. Cl. ......................................... 65/319; 65/306; 65/356; 65/374.12
[58] Field of Search .............. 65/306, 319, 356, 374.1, 65/374.12

[56] References Cited

U.S. PATENT DOCUMENTS 4,067,711  1/1978  Jones ..................................... 65/319

FOREIGN PATENT DOCUMENTS 443001  5/1975  U.S.S.R. ................................ 65/319

Primary Examiner—Arthur Kellogg
Attorney, Agent, or Firm—Kurt Kelman

[57] ABSTRACT

In order to form a steam cushion between a glass and a metal mold during operation blowing the glass in the mold, the mold is provided with a large number of small holes mechanically-formed in and distributed over the inner surface of the mold for retaining water therein. Since the metallic inner surface of the mold is directly exposed to the molding cavity of the mold, the mold is not substantially subjected to abrasion and burning during the blowing operation so that the working life of the mold is extended.

6 Claims, 3 Drawing Figures

MOLDS USED FOR BLOWING GLASS ARTICLES

CROSS-REFERENCE TO RELATED APPLICATION

This is a continuation of my copending application Ser. No. 605,786, filed May 1, 1984 now abandoned.

BACKGROUND OF THE INVENTION

1. Field of the Invention

This invention relates to molds in which glass articles are blown rotationally or non-rotationally.

2. Description of the Prior Art

In the production of hollow glass articles, a method of rotationally blowing glass articles molds has been well known in. A mold used in such a method is usually referred to as a paste mold, as disclosed in U.S. Pat. No. 3,350,189 and British Pat. No. 1,084,816, and is provided on its inner molding surface with a lining consisting of a paste layer.

The paste layer is porous and can absorb water so that a steam cushion is formed between the glass and the mold due to a high temperature of the glass parison. Thereby, the glass is prevented from directly contacting and sticking to the mold during the blowing operation so that the molded article can be readily released from the mold and has a smooth and glossy surface.

A known typical paste layer is formed by coating a paste on the inner surface of a mold of cast iron, for example sticking cork powder onto the paste and baking them to form a carbonized cork layer on the inner surface of the mold. The carbonized cork layer is porous and can absorb and retain water.

However, since the paste layer, such as a carbonized cork layer, is abraded and burned in use, its water absorbability or chargeability degrades so that the steam cushion is formed insufficiently after prolonged use to develop scars and grains on the surface of molded glass article. For this reason, the deteriorated carbonized cork layer should be removed prior to the development of such surface defects and a fresh carbonized cork layer should be applied. Such a paste mold has thus disadvantages that it is low in working ratio and high in maintenance cost.

In addition, such a paste mold has a problem that fine carbonized cork pieces may be stuck firmly on the surface of molded glass product.

In order to remove those disadvantages of the paste mold, blow molds are proposed in Japanese Patent Publication No. 10438/'62 and Japanese Utility Model Publication No. 9726/'65, wherein the mold is made of a sintered alloy and is provided with no paste layer.

Since a sintered alloy has high porosity, the sintered alloy mold having no paste layer can retain water in the pores. Accordingly, a steam cushion can be formed between the glass surface and the inner surface of the mold during the blowing operation. In addition, since the alloy is exposed to the inner surface of the mold, the mold is subjected to neither abrasion nor damage during blowing operation so that the working life is drastically extended as compared with the paste mold. The working ratio and the maintenance cost are also improved.

However, in the sintered alloy mold, those pores are formed in a network form by connection of gaps between the sintered alloy grains so that the outer and inner surfaces of the mold are connected through such pores. Hence, the steam formed during the blowing operation leaks through the pores to the exterior of the mold so that a sufficient steam cushion cannot be formed between the molded glass surface and the inner surface of the mold. In addition, since the pores are very fine, they are apt to be plugged by hardness components and other fine contaminants in water. This means reduction of the amount of leaking steam, but the water amount absorbed and retained in the pores of the mold is also reduced so that a sufficient steam cushion cannot be formed. Furthermore, once the pores are plugged, the mold cannot be reused so that the working life of the mold is shortened. Therefore, the sintered alloy mold is uneconomical in view of the fact that the sintered alloy is expensive.

Still further, since the sintered alloy is brittle, the sintered alloy mold is easily broken.

In the production of asymmetric hollow glass articles and articles having a surface pattern, a mold is usually used in the blowing process but no rotation is given to the glass parisons.

SUMMARY OF THE INVENTION

It is an object of the present invention to provide a mold used for blowing glass articles wherein the steam cushion can be reliably formed for an extended working life, and maintenance can be readily performed.

It is another object of the present invention to provide such a blow mold which is economical and has a sufficient mechanical strength.

According to the present invention, a metallic mold used for blowing glass articles comprises a great number of small blind holes for retaining water therein and being mechanically formed in an inner surface of the mold. The small blind holes are distributed over the entire inner surface.

Since the inner surface of the mold is the metal surface, neither substantial abrasion nor burning occurs in use so that its mold is remarkably improved in the working life and the working ratio as compared with the known paste mold. As the small blind holes are formed mechanically, for example, by drilling, any plugging in the blind holes can be readily removed so that the mold of the present invention can be reused by simple treatment.

The blind holes used in the present specification means open-topped small cavities, such as small holes, small grooves, small channels and the like.

Further objects, features and other aspects of the invention will be understood from the following detailed description of preferred embodiments thereof, with reference to the accompanying drawings.

DETAILED DESCRIPTION OF THE PREFERRED EMBODIMENTS

As disclosed in the above-mentioned U.S. patent and British patent, a mold is split into two like halves.

Figure 1:
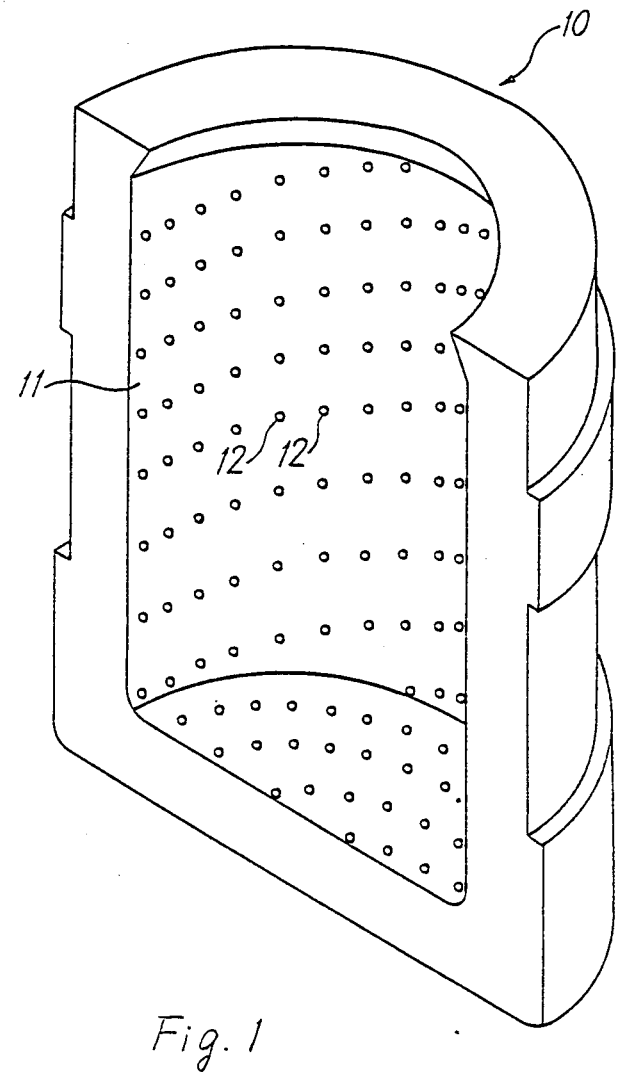
FIG. 1 is a perspective view of a half member of a mold according to an embodiment of the present invention.

Referring to FIG. 1, a mold 10, only a half member of which is shown therein, is made of cast iron or other suitable metal.

The inner surface 11 of mold 10 is drilled with a great number of small blind holes 12 over the entire surface by means of a perforator, such as a drill, etc. Each small blind hole 12 extends towards the outer surface of the mold and terminates in the wall of mold 10 so that it is not a through hole. The inner surface 11 of mold 10 is not covered with any paste layer and is exposed to the molding cavity of the mold.

In the arrangement of the mold, when water is sprinkled onto the mold prior to a blowing operation, water is retained in small blind holes 12. During the blowing operation, the retained water is evaporated due to heat of the glass parison to form a steam cushion between the glass surface and the inner surface 11 of mold 10, similar to the known paste mold.

Figure 2:
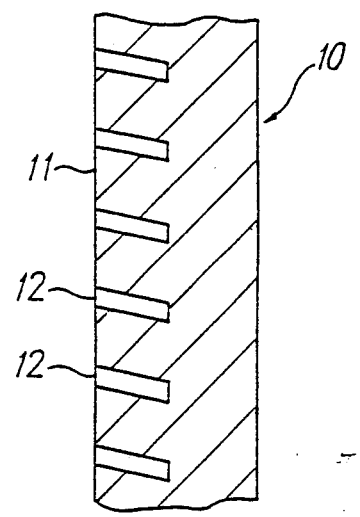
FIG. 2 is a partial sectional view of the half member.

Each hole 12 has, for example, a diameter ranging from 0.5 to 5 mm and a depth from 2 to 15 mm. The number of the small holes 12 ranges from 2 to 20 per 5 $cm^2$ of the inner surface 11. In order to improve the retention of water in small blind holes 12, each hole 12 is preferably inclined downwardly towards a bottom thereof, as shown in FIG. 2.

When water is sprinkled over the inner surface of the mold, water flows down along the inner surface 11 of mold 12 so that less water is retained in the holes in the upper area of the inner surface 11 as compared with the lower area. Therefore, if it is desired to form a uniform steam cushion, the blind holes are formed at a comparatively high density in the upper area.

Furthermore, the small holes 12 are not arranged at the same level but preferably at various levels in order to form a uniform steam cushion. In the embodiment of FIG. 1, the small holes are arranged on an imaginary helical line extending along the inner surface 11 from an upper portion to a lower portion in the rotating direction of the parison during the blowing operation.

The blowing operation using mold 10 is carried out in a similar manner to that using a conventional paste mold. Namely, two half members of mold 10 are secured to a molding machine and water is flashed onto the inner surface 11 of mold 10, thereby retaining water in blind holes 12. Then, a high temperature glass parison is charged into mold 10 and blown with air while rotating it to expand the parison to the inner surface 11 of the mold to shape a glass article. At that time, the water retained in small holes 12 is evaporated due to the heat of the high temperature parison to form a steam cushion between inner surface 11 of mold 10 and the glass surface, thereby preventing the direct contact of glass with the inner surface 11 of mold 10. As a result, glass articles having a smooth and glossy surface can be produced.

Since the mold 10 is made of metal and has no paste layer, the inner molding surface 11 and other portions are subjected to neither substantial abrasion nor burning during the blowing operation so that the working ratio is remarkably improved. Moreover, even if blind holes 12 are plugged, the plugged foreign materials can be readily removed from the holes 12 because the holes are mechanically drilled. Therefore, the mold can be reused conveniently.

Figure 3:
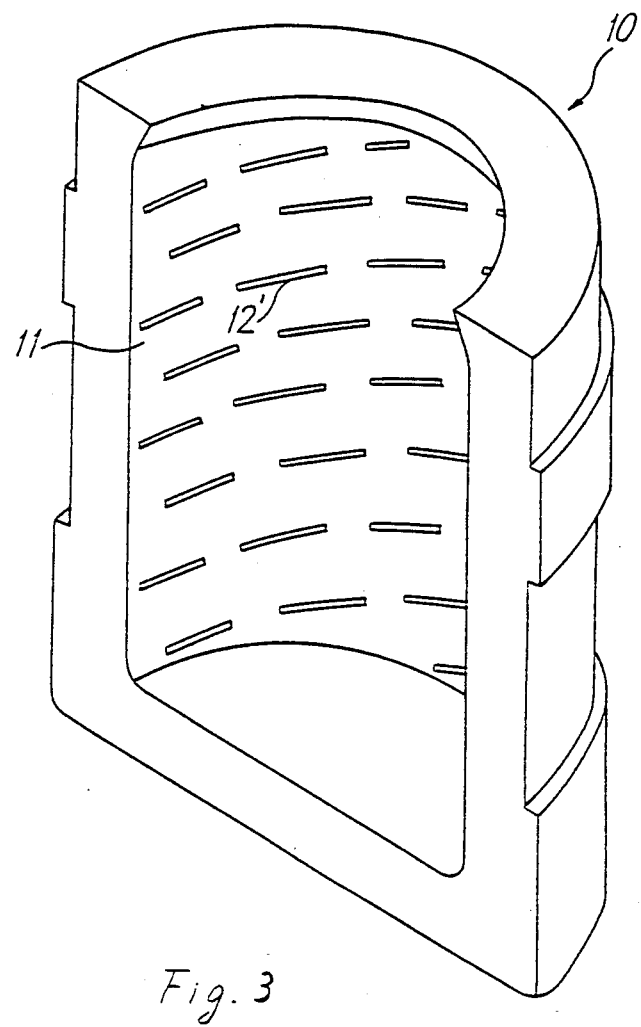
FIG. 3 is a perspective view of a half member of another embodiment.

In the above mentioned embodiment, small round holes 12 are formed in the inner surface of the mold. But, the blind holes may have any other cross-section, and may be discontinuous elongated grooves 12' as shown in FIG. 3.

In the above-mentioned embodiments, the mold is made of a cast metal, but it may be made of a sintered alloy which is porous. In this case, a great number of blind holes are formed in the inner surface of the sintered metal mold according to the present invention and water is retained in the depressions. Therefore, even if pores of the sintered alloy are plugged, the mold can be used as it is.

This invention has been described in connection with a mold for rotationally blowing glass articles, but the present invention can be also applied to a mold for stationarily blowing asymmetric glass articles having no surface pattern so as to obtain such glass articles having a smooth and glossy surface.

What is claimed is:

1. A metallic mold for blowing glass article which consists of a water- and steam-impermeable met; wall having an inner molding surface and a multiplicity of small water-retaining and steam-impermeable blind holes mechanically formed in the metallic wall and distributed over the entire inner molding surface, each one of the blind holes extending from the inner surface to a bottom of the hole in the metallic wall.

2. The mold as claimed in claim 1, wherein each of said blind holes is inclined downwardly towards the bottom thereof.

3. The mold as claimed in claim 1, wherein said blind holes are formed on an imaginary helical line extending along said molding surface from an upper portion to a lower portion thereof.

4. The mold as claimed in claim 1, wherein the blind holes are distributed more densely over an upper portion of the inner molding surface than over a lower portion thereof.

5. The mold as claimed in claim 1, wherein said blind holes are small round holes.

6. The mold as claimed in claim 1, wherein said small depressions are small grooves.

* * * * *